Feb. 23, 1926.

M. L. MARTUS ET AL 1,574,300

PRIMARY BATTERY

Filed June 2, 1924　　3 Sheets-Sheet 1

INVENTORS
Martin L. Martus,
Edmund H. Becker, and
James G. Ross.
BY Chamberlain & Newman
ATTORNEYS.

Feb. 23, 1926.

M. L. MARTUS ET AL 1,574,300

PRIMARY BATTERY

Filed June 2, 1924   3 Sheets-Sheet 2

INVENTORS
Martin L. Martus,
Edmund H. Becker, and
James G. Ross
BY
Chamberlain & Newman
ATTORNEYS.

Feb. 23, 1926.
M. L. MARTUS ET AL
1,574,300
PRIMARY BATTERY
Filed June 2, 1924
3 Sheets-Sheet 3

INVENTOR.
Martin L. Martus,
Edmund H. Becker and
James G. Ross.
BY
Chamberlain & Newman
ATTORNEYS.

Patented Feb. 23, 1926.

1,574,300

UNITED STATES PATENT OFFICE.

MARTIN L. MARTUS, OF WOODBURY, AND EDMUND H. BECKER AND JAMES G. ROSS, OF WATERBURY, CONNECTICUT.

PRIMARY BATTERY.

Application filed June 2, 1924. Serial No. 717,225.

*To all whom it may concern:*

Be it known that we, MARTIN L. MARTUS, a citizen of the United States, residing at Woodbury, in the county of Litchfield and State of Connecticut, and EDMUND H. BECKER and JAMES G. ROSS, both citizens of the United States, and both residing in Waterbury, in the county of New Haven and State of Connecticut, have invented new and useful Improvements in Primary Batteries, of which the following is a specification.

This invention relates to an improved primary battery, an object being to provide a battery unit of this character of compact form, particularly adapted for radio or filament lighting, and further to provide a unit adapted to be assembled with similar units in a stand or support, according to the invention, in a manner to provide any desired voltage for the special use to which the battery is put. Another object is to provide a battery in which the electrode elements will be supported in a manner as to be entirely spaced from each other and independently mounted, preventing internal short circuits, and further to provide such elements which may be adjusted vertically independently of each other, and which will be self-centering within the jar or container.

A still further object is to provide an improved stand or support for a plurality of battery units, adapted to seal them, to support them rigidly against movement with respect to each other, and to permit of their convenient unsealing and removal for the purpose of emptying and renewing the solution or changing the electrodes.

With the above and other objects in view, embodiments of the invention are shown in the accompanying drawings, and these embodiments will be hereinafter more fully described with reference thereto, and the invention will be finally pointed out in the claims.

Figure 1:
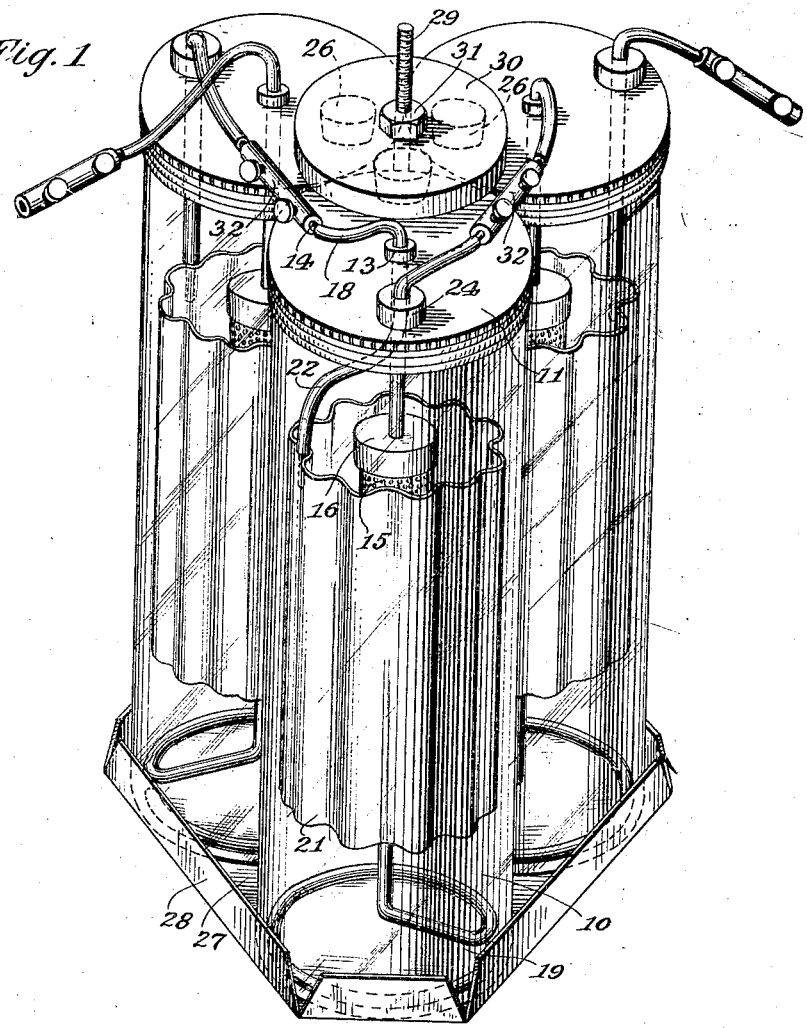
Fig. 1 is perspective view of a battery group according to the invention, in which a plurality of battery units are supported in a clamping stand.
Figure 2:
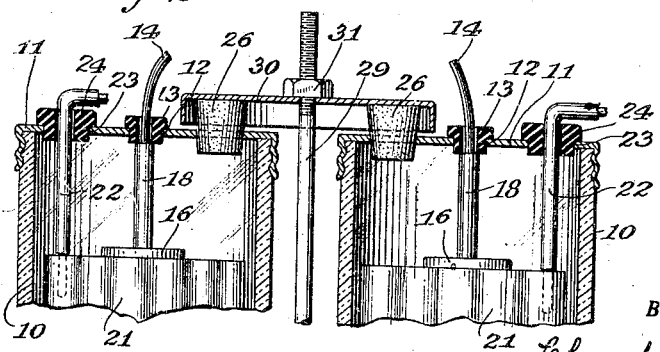
Fig. 2 is a vertical sectional view of the upper portion of the same.
Figure 3:
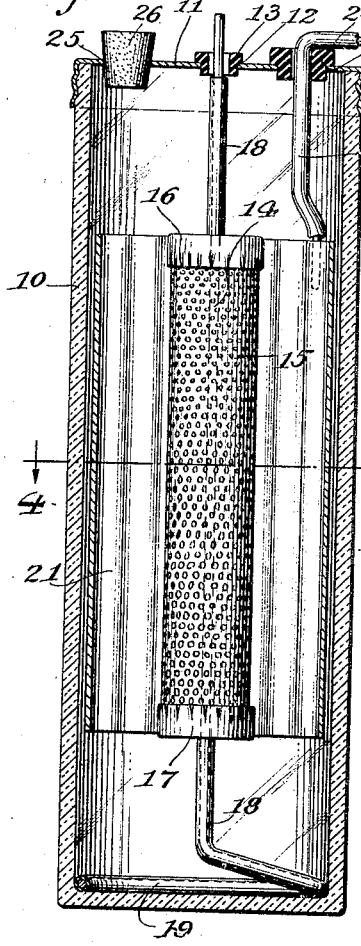
Fig. 3 is a vertical sectional view of the battery unit, according to one embodiment of the invention.

Referring to the drawings, and more particularly to Figs. 1 to 4 thereof, the battery unit, according to the embodiment of the invention shown therein, comprises a cylindrical glass jar 10 having a screw-cap or cover 11 thereon, provided with a central aperture 12 having a rubber bushing 13 therein, and in which is engaged a vertical wire 14 extending centrally down into the jar, and upon which a perforated cylindrical basket 15 is supported by flanged centrally perforated caps 16 and 17 engaged upon the wire. The portions of the wire extending above and below the basket are covered by tubes of insulating material 18, the ends of which abut said caps to fix the position of the basket within the jar.

At its lower end the wire is bent into a flat or laterally disposed circular base 19, which rests upon the base of the jar and engages the inner periphery of the same to centralize the basket, so that it remains in a vertical position coaxial with the vertical axis of the jar. The basket is filled with a suitable negative electrode substance, 20, as copper oxid scale, and forms the negative element of the battery.

The positive element 21 of sheet zinc, is of tubular form and vertically corrugated, and is supported within the jar by an insulation covered wire 22 extending upwardly through a perforation 23 in the cap, this perforation being insulated by a rubber bushing 24. The zinc is suspended in its vertically adjusted position by bending the wire over upon the upper end of the bushing 24, as clearly indicated in Figs. 2 and 3, and, the vertical position may be readily changed, without disturbing the negative electrode by merely raising or lowering the wire and bending the same at a different place. The inner surface of the zinc is annularly spaced about the negative element, and inasmuch as the high points of the corrugations substantially engage the inner surface of the jar the same is vertically positioned and centralized.

The cap is also provided with an aperture 25, having a removable stopper 26 of rubber or the like inserted therein, which normally seals the jar substantially air-tight, and can be conveniently removed, when desired, for the purpose of emptying and renewing the caustic soda solution with which the jar is filled, when in use.

Figure 5:
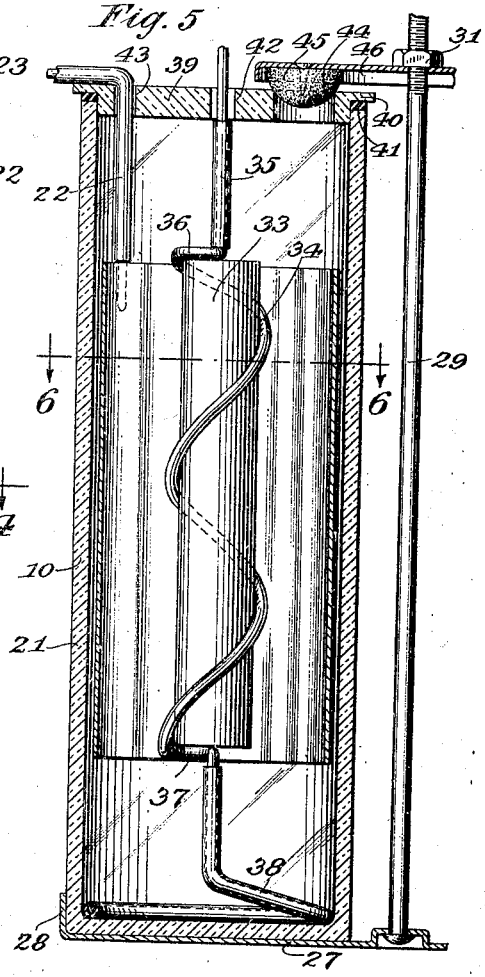
Fig. 5 is a vertical sectional view of a battery unit, according to a modification of the invention, and showing a portion of a modified form of stand.
Figure 4:
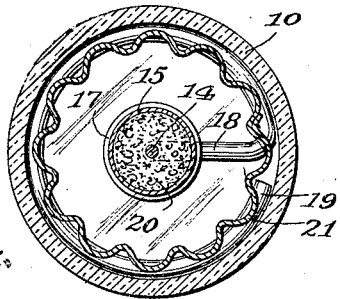
Fig. 4 is a horizontal sectional view of the same, taken along the line 4—4 of Fig. 3.

In order to assemble and support a plurality of battery units, three in the present illustration, a stand is provided, according to our invention, comprising a sheet metal base 27 of substantially triangular shape having upturned flanges 28 at its edges adapted to engage and retain the jars upon said base, and also provided with a vertical rod 29 secured centrally, as shown in Fig. 5, and extending upwardly between the jars. The upper threaded end of the rod has a flanged cap 30 provided thereon, which is clamped down upon the stoppers 26 of the several jars by means of a nut 31, to thereby secure the stoppers in place and rigidly retain the jars with respect to each other. The wires of the positive and negative electrodes of the several battery units are connected in the usual manner by couplings 32.

Figure 6:
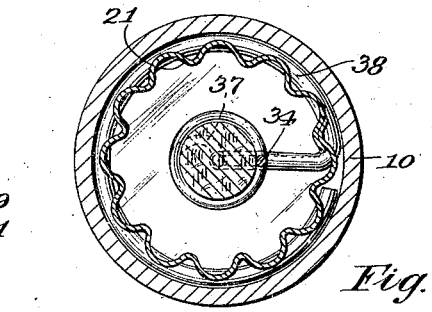
Fig. 6 is a horizontal sectional view, taken along the line 6—6 of Fig. 5.

In Figs. 5 and 6 we have illustrated another form of negative element consisting of a compressed oxid of copper cylinder 33, supported within a coiled portion 34 of the conductor wire 35, said wire at the ends of said coiled portion being bent laterally, as at 36 and 37 to engage and support the ends of the cylinder, the wire above and below the cylinder being covered with insulation tubing, and at its base is bent into circular form, as at 38, in a similar manner to the form illustrated in Figs. 1 to 4.

The jar cover, illustrated in Figs. 5 and 6, and also the stand or support for the plurality of battery units, are of modified form. The cover 39 is of porcelain, flanged at 40 to engage a rubber gasket 41 at the upper end of the jar, and is apertured at 42 and 43 for passage therethrough of the positive and negative conductor wires. A larger aperture 44 is also provided in the cover, which is engaged by a semi-spherical rubber stopper 45 secured to the cap 46 of the supporting stand, so that upon tightly clamping down said cap the jar cover is securely sealed and the jar is rigidly clamped. By removing or loosening the cap 46 the several battery units are released and the apertures 44 are opened for supplying water or solution.

According to our invention the two electrode elements of the battery are supported entirely independently of each other, with no connection between them to form bridges or short circuits, such as have occured heretofore with the usual insulation employed between the elements or the supporting means for the elements. The two elements are self-centralized with respect to the jar and vertical adjustment of the zinc may be effected by merely raising or lowering the wire 22 and bending the same to fix the adjusted position. The elements are independently removable, without disturbing their respective supporting means, so that renewal of either element may be conveniently made.

Figure 7:
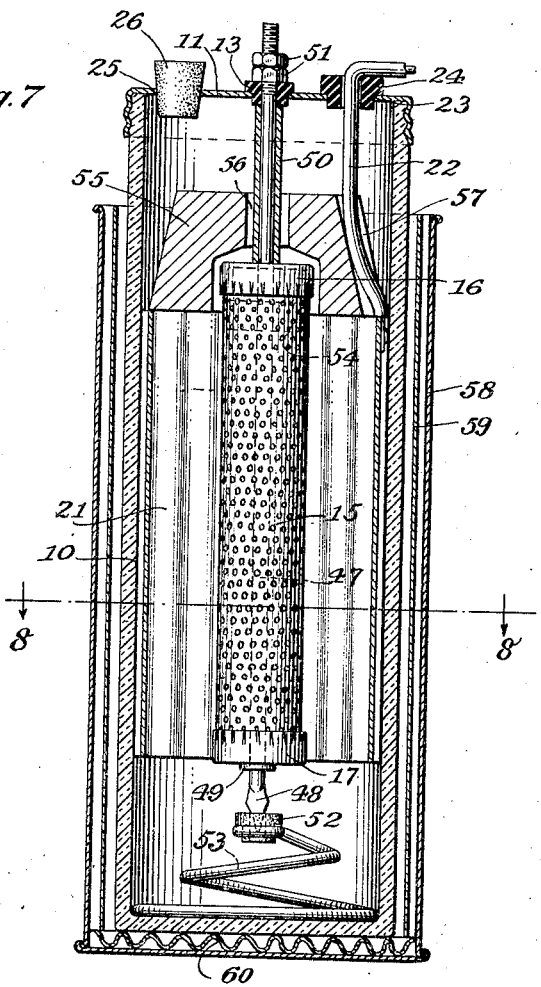
Fig. 7 is a vertical section of another modification.
Figure 8:
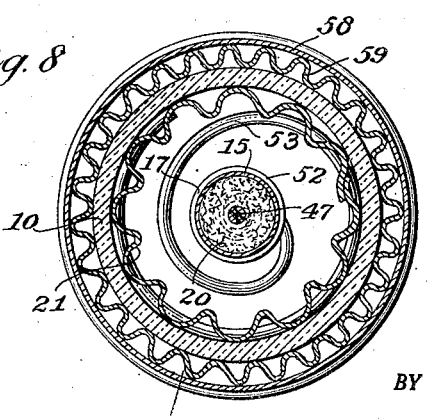
Fig. 8 is a section on the line 8—8 of Fig. 7.

In Figs. 7 and 8 there is illustrated a further modification, in which the negative element 15 has a vertical rod 47 extending centrally therethrough and through the end caps 16 and 17, and provided at its lower end with a spear point 48, the rod being flanged adjacent its lower end, as at 49, to engage and support the under side of the element, and provided between the upper cap 16 and the bushing 13 with a spacing tube 50, the upper end of the rod being threaded and provided with securing nuts 51.

The spear point 48 engages a socket member 52 held in the end of a coil spring 53 disposed in the base of the jar 10, and having its lower convolution of circular form and engaging the cylindrical wall of the jar to centralize the element under all conditions of use, and particularly when the battery is subjected to vibration or shock.

Within the upper end of the negative element container there is provided an oil container 54, preferably in the form of a capsule of a substance adapted to be dissolved or otherwise effected by the battery solution to release the oil, which being lighter than the solution rises to the top to form a protective film. The protective film of oil is adapted to prevent evaporation and capillary creepage of the solution, and the manner of liberating the same after the elements are completely submerged by the solution prevents any possibility of the same becoming coated with the oil, as might occur, for instance, when the elements are lowered into a solution having a film of oil already poured thereon.

In order to enable the battery to be prepared for functioning merely by the addition of water, the same is provided with a cake 55 of caustic soda in solid form, having a shouldered passage 56 therethrough for engagement over the upper end of the negative element in spaced relation thereto, and adapted to rest upon the upper end of the zinc element in spaced relation to the wall of the jar. A groove 57 is formed in the side of the cake in which is engaged the lead wire 22 of the zinc element, and which is bent into said groove for the purpose of retaining the cake in position during shipment.

The glass jar is placed in a protective container in the form of a metal can 58, spaced from the jar and having a lining 59 of corrugated paper or other suitable cushioning protective material engaging the jar, and also a bottom protective layer 60 of similar material upon which the jar rests. The container not only protects the jar against shocks, but will retain the electrolyte solution if the jar is accidentally broken.

In order to start the battery to functioning, it is only necessary to add water thereto up to the proper level through the opening 25, the cake 55 dissolving therein to form the electrolyte solution, and the oil contained in the capsule 54 being liberated to form a protective film or layer.

It will be noted that the jar is relatively tall and of small diameter, and it is important that this ratio is followed, as the efficiency of the battery is dependent thereon to a great extent, the dissolving of the soda, the radiation of the heat of the solution, and the diffusion of the electrolyte all being governed by the height of the jar. A cake of soda of about three ounces dissolves in about twenty minutes, which is slow enough to dissipate the heat very gradually, so that the glass will not crack, and the location of the soda in the jar is such that the solution does not require stirring to dissolve it.

It will be understood that the invention is adaptable to use with secondary battery units, in which case the solution and materials of the elements will be changed, as is well known.

We have illustrated and described preferred and satisfactory embodiments of the invention, but it will be obvious that changes may be made therein, within the spirit and scope thereof, as defined in the appended claims.

Having thus described our invention, what we claim and desire to secure by Letters Patent is:

1. In a battery, a jar, an electrode element, spring means supporting said element vertically within said jar engaging the inner upright wall of the jar and adapted to centralize said element along the vertical axis of the jar, another electrode element spaced from said first element, and means supporting said last named element within the jar independently of said first element.

2. In a battery, a jar, a cover therefor, an electrode element, spring means resting upon the base of the jar and supporting said element therein in a relatively fixed position, another electrode element in spaced relation to said first element, and means supporting the same from said cover independently of said first element.

3. In a battery, a jar, a cover therefor, an electrode element, spring means resting upon the base of the jar and supporting said element therein in a relatively fixed position, another electrode element in spaced relation to said first element, and means supporting the same from the top of the jar independently of said first element, and vertically adjustable with respects to said cover.

4. In a battery, a jar, a cover therefor, an electrode element, spring means resting upon the base of the jar and supporting said element therein in a relatively fixed position, said cover having a perforation, another electrode element in spaced relation to said first element, and a wire connected to said second element extending upwardly through said perforation and adapted to be bent over upon said cover to fix the vertical position of said second element.

5. In a battery, a jar, an electrode element, spring means supporting said element vertically within said jar and including a laterally disposed base resting upon the base of the jar and abutting the side walls of the jar to centralize said element along the central axis of the jar, another electrode element spaced from said first element, and means supporting said last named element within the jar independently of said first element.

6. In a battery, a jar, an electrode element, said jar having a top provided with a central perforation, a support for said electrode comprising a vertically disposed wire extending upwardly through said perforation of said top, connected to support said electrode intermediately the upper and lower ends of said jar, and having a laterally disposed base resting upon the base of the jar and engaging the inner surface thereof to centralize said element, another electrode element spaced from said first element, and spring means supporting said last named element within the jar independently of said first element.

7. In a battery, a jar, an electrode element, said jar having a top provided with a central perforation, a support for said electrode comprising a vertically disposed wire extending upwardly through said perforation of said top, coiled about said electrode to support the same intermediately the upper and lower ends of said jar, and having a laterally disposed base resting upon the base of the jar and engaging the inner surface thereof to centralize said element, another electrode element spaced from said first element, and means supporting said last named element within the jar independently of said first element.

8. In a battery, a jar, an electrode element, means supporting said element vertically within said jar engaged with the inner upright wall of the jar and adapted to centralize said element along the vertical axis of the jar, a tubular electrode element annularly surrounding and spaced from said first element, and means supporting said last element within the jar independently of said first element.

9. In a battery, a jar, an electrode element, means supporting said element vertically within said jar and adapted to centralize it along the vertical axis of the jar, a tubular vertically corrugated electrode element annularly surrounding and spaced from said first element, the high points of its corrugations substantially engaging the inner surface of the jar to centralize said element, and means supporting said last element within the jar independently of said first element.

10. In combination, a battery including a jar, a removable top having an aperture, and electrode elements supported in said jar, a supporting stand for said battery including a base upon which the jar rests, a vertical rod extending upwardly from said base, a clamping cap upon the upper end of said rod, and means for clamping said cap downwardly relatively to said top of the jar, and stopper means inserted in said aperture of the top beneath the cap of said supporting stand, and secured by the clamping of said cap.

11. In combination, a battery including a jar, a removable top having an aperture, and electrode elements supported in said jar, a supporting stand for said battery including a base upon which the jar rests, a vertical rod extending upwardly from said base, a clamping cap upon the upper end of said rod, and means for clamping said cap downwardly relatively to said top of the jar, and stopper means secured to the under side of said cap and inserted in said aperture of the top to close the same and clamp the battery.

12. In combination, a plurality of battery units, each including a jar, a removable top having an aperture, and electrode elements supported in said jar, a supporting stand for said battery units including a base upon which the jars rest, a vertical rod extending upwardly from the base, a clamping cap upon the upper end of said rod and extending over the tops of the several battery units, and means for clamping said cap downwardly relatively to said tops, and stopper means inserted in said apertures of the tops beneath the cap of said supporting stand, and secured by the clamping of said cap.

Signed at Waterbury in the county of New Haven and State of Connecticut, this 29th day of May A. D., 1924.

MARTIN L. MARTUS.
EDMUND H. BECKER.
JAMES G. ROSS.